United States Patent [19]
Paek

[11] Patent Number: 4,516,826
[45] Date of Patent: May 14, 1985

[54] SINGLE MODE LIGHTGUIDE FIBER HAVING A TRAPEZOIDAL REFRACTIVE INDEX PROFILE

[75] Inventor: Un-Chul Paek, West Windsor Township, Mercer County, N.J.

[73] Assignee: AT&T Technologies, Inc., New York, N.Y.

[21] Appl. No.: 487,402

[22] Filed: Apr. 21, 1983

[51] Int. Cl.³ ............................................. G02B 5/172
[52] U.S. Cl. .................................................. 350/96.31
[58] Field of Search ................. 350/96.29, 96.30, 96.31

[56] References Cited
U.S. PATENT DOCUMENTS

| | | | |
|---|---|---|---|
| 3,916,182 | 10/1975 | Dabby et al. | 350/96.31 X |
| 4,110,093 | 8/1978 | Macedo et al. | 65/3 R |
| 4,277,271 | 7/1981 | Krohn | 350/96.31 X |
| 4,452,508 | 6/1984 | Beales et al. | 350/96.31 |

FOREIGN PATENT DOCUMENTS

| | | | |
|---|---|---|---|
| 1901053 | 6/1970 | Fed. Rep. of Germany | 350/96.31 |
| 2519774 | 7/1983 | France | 350/96.29 |

OTHER PUBLICATIONS

Kubota et al., Trans. IECE of Japan, vol. E63, No. 10, Oct. 1980, "Random-Bend Loss . . . ", pp. 723–730.
White, Electronics Letters, vol. 18, No. 17, Aug. 19, 1982, "Design Parameters for Dispersion . . . ", pp. 725–727.

Primary Examiner—William L. Sikes
Assistant Examiner—Frank González
Attorney, Agent, or Firm—D. J. Kirk

[57] ABSTRACT

A single mode lightguide fiber having a trapezoidal shaped refractive index profile. In a particular embodiment the ratio of the upper base to the lower base is less than 0.3.

3 Claims, 3 Drawing Figures

SINGLE MODE LIGHTGUIDE FIBER HAVING A TRAPEZOIDAL REFRACTIVE INDEX PROFILE

TECHNICAL FIELD

The instant invention relates to lightguide fibers. In particular, the invention is directed to a single mode lightguide fiber having a graded index profile.

BACKGROUND OF THE INVENTION

It is known that a dispersion-free single mode lightguide fiber can provide a bandwidth in excess of 100 GHz.km at a desired wavelength. Presently, the current effort for further development of such fiber is focused on the reduction of transmission loss so that the repeater span distance may be increased. One of the means for achieving a lower loss is to shift to a longer operating wavelength, typically in the neighborhood of 1.50 μm.

Additionally, efforts have been devoted to the fabrication of single-mode fibers with graded refractive index which provide lower loss and a dispersion-free fiber. The grading of the refractive index in the core is obtained by doping with certain chemicals (e.g., germanium). In particular, single mode fiber with a triangular-index profile have been fabricated with an attenuation loss of 0.24 dB/km and minimum dispersion, both occurring at a wavelength of 1.55 μm.

The random bend losses of single mode fibers in terms of a variety of the configurations of refractive index profiles; convex, parabolic, step and concave shapes have been investigated and are set forth in an article entitled "Random-Bend Loss Evaluation in Single-Mode Optical Fiber With Various Index Profiles" by M. Kubota et al., in *Trans. IECE Japan*, E63, 723 (1980). This analysis was developed based on the loss mechanism due to the small deviation of the profile caused by bending the fiber. It was found that the bending loss of the convex structure, particularly in a parabolic refractive index profile is lower than that of the step-index profile.

The worst case was found to be the concave shape that is somewhat similar to an index profile possessing a central dip. It is well known that the optical fibers produced by the MCVD process inevitably accompany a central dip (or burnout) in its index profile due to evaporation of a dopant (i.e.; germanium) during the preform collapsing stage. When considering the configuration of a triangular-index profile having a central dip one can suspect that the profile may, undesirably, be structurally pliant to an external force and thus easily induce a high bending loss. Also, it is known that single mode fibers having a step index profile have a relatively small core diameter which presents difficulties when splicing fiber ends together.

Accordingly, there is a need to provide a single mode lightguide fiber with minimal bending loss and relatively large diameter cores.

SUMMARY OF THE INVENTION

The instant invention is directed to a single mode lightguide fiber having a refractive index profile with the shape of a trapezoid.

Advantageously, the instant single mode trapezoidal index fiber has less bending loss than a triangular index fiber and a larger core diameter than a step index fiber.

DETAILED DESCRIPTION

In designing a single mode lightguide fiber with zero disperson at a desired wavelength, the profile exponent $\alpha$ is the most effective parameter for increasing the fiber radius. As $\alpha$ decreases the core radius increases accordingly. The $\alpha$ value is defined from the following expression for an ideal index distribution (i.e., $\alpha$- index profile) of a clad fiber:

$$n = n_1[1 - \Delta r^\alpha]$$

where
r = normalized radius of the core ranging from 0 to 1;
n = index of refraction at a radius r;
$n_1$ = index of refraction at the center of the core;
$\Delta = (n_1 - n_2)/n_1$; and
$n_2$ = index of refraction of the cladding.

Theoretically, a single mode fiber having triangular index profile (see FIG. 1), wherein $\alpha = 1$ gives the largest core radius but, in practice, preforms fabricated by the MCVD process have an index dip at the center of the core. This may cause an increase in sensitivity of micro and macro bending loss in the fiber to an applied load. Alternatively, a step index profile wherein $\Delta = \infty$ will provide a more rigid structure to lessen bending losses but results in a single mode fiber of minimum core diameter.

A single mode lightguide fiber having a trapezoidal refractive index profile is hereby proposed. Advantageously, such a fiber has been found to have the desirable characteristics of both the triangular and step refractive index fibers. For example, the larger core diameter of a triangular-index profile and the rigid structure of the step index profile which decreases the bending loss.

Figure 1:
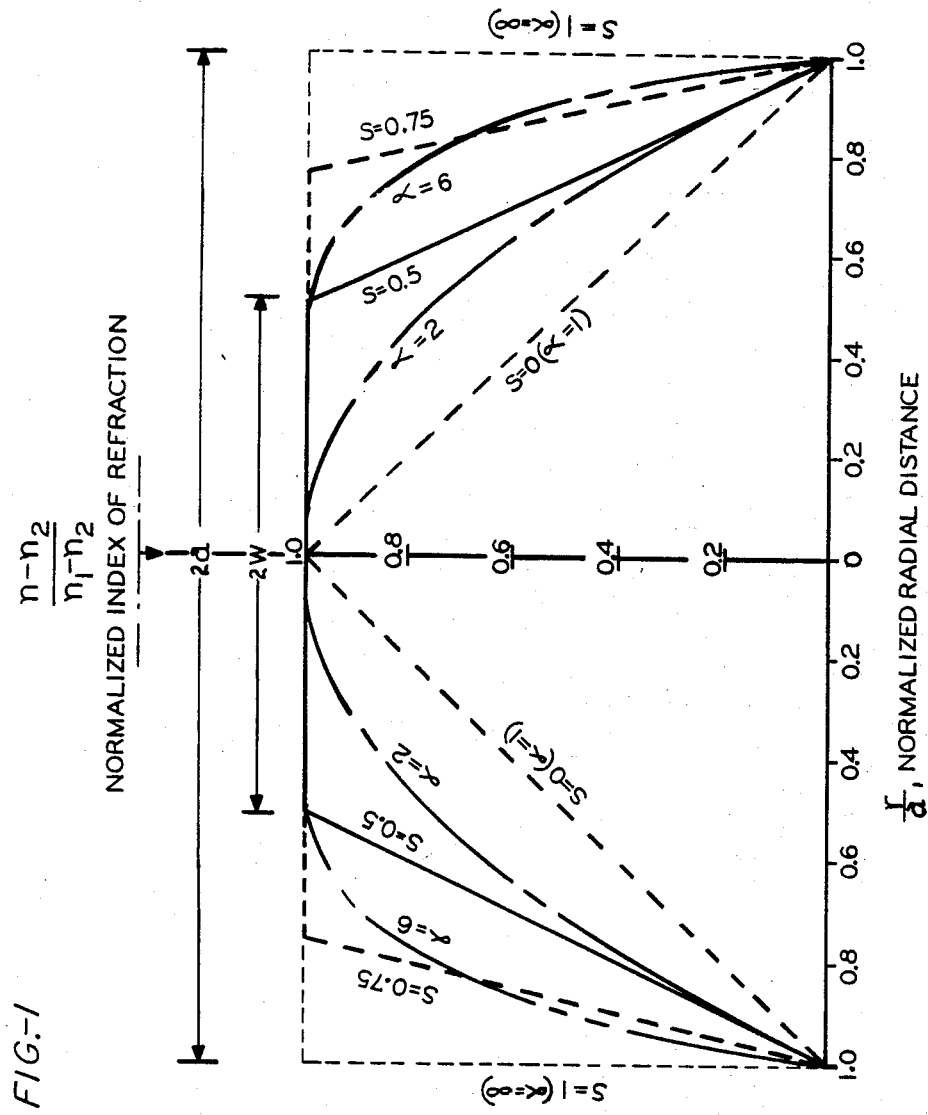
FIG. 1 depicts refractive index profiles associated with various index ratios versus the normalized radial distances of single mode fibers.

The aspect ratio, S, of a trapezoid is defined by a ratio of the upper base to the lower base and ranges between 0 and 1 (see FIG. 1). When S = 1 the refractive index has a step profile and when S = 0 the profile is triangular. Between S = 1 and 0 the profiles are trapezoidal.

In production of a dispersionless single-mode fiber that can operate at a given wavelength, it is a known practice to draw the preform to a fiber with an optimum core size $a_{opt}$ which is defined as the radius "a" where the total dispersion ($D_t$) is equal to zero. Therefore, it is of paramount importance to know the $a_{opt}$ for a given index prior to the fiber drawing process. FIG. shows the relation between $a_{opt}$ and S for three different wavelengths and $\Delta = 0.008$. From the figure, it is important to note that in all three cases, the optimum core radius approaches a certain value as S decreases. When S is less than 0.3, the value of $a_{opt}$ becomes practically a constant that is no longer dependent on S but strongly depends upon a wavelength.

Figure 2:
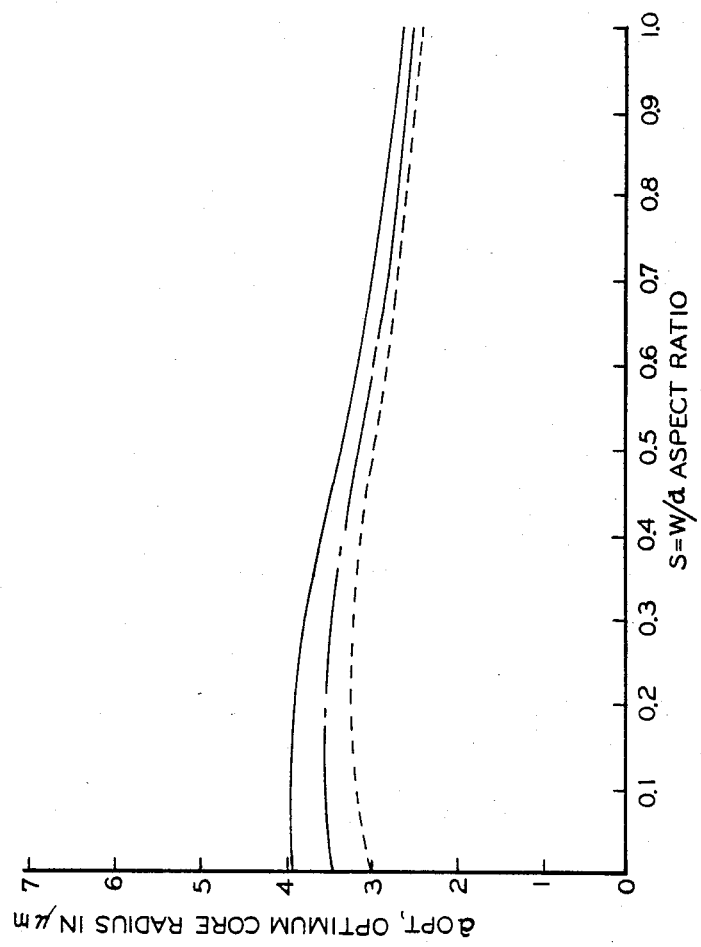
FIG. 2 is a set of curves showing the relation between optimum core radius and the aspect ratios at three different wavelengths.

According to FIG. 2, the shorter the wavelength, the larger the optimum core radius. In this case, the ultimate values of $a_{opt}$ are close to 3.93, 3.54, 3.16 μm, for the wavelengths of $\mu = 1.45$, 1.50, and 1.55 μm, respectively. In fact, this is an important and unique characteristic of a trapezoidal-index profile single-mode fiber and can relieve a great deal of the tolerance problems that are usually experienced in fabricating graded index profile fibers.

It has been discovered that when altering the trapezoidal index profile of a single mode lightguide fiber by decreasing S, the optimum core radius increases. However, unexpectedly, the optimum core radius approaches a substantially constant value when S is less than 0.3, becoming independent of S for a given wavelength. Additionally, the core size is largely dependent on an operating wavelength in a range between 1.45 and 1.55 $\mu$m. For example it has been found that for S=0.25 the $a_{opt}$ is almost 50% larger than that of the step-index case at $\mu = 1.50$ $\mu$m and nearly equal to that of the triangular-index profile at the same wavelength.

In an exemplary embodiment the instant single mode lightguide fiber had a total dispersion of less than 5 psec/km.nm in at least a portion of the region of 0.6 to 1.7 $\mu$m which supports only one guiding mode.

Advantageously, due (1) to the linear shape of the trapezoidal index profile proximate the core-clad interface and (2) to better field confinement, transmission losses as low as a single mode triangular index fiber can be achieved in the range of wavelengths between 0.6 and 1.7 $\mu$m.

The trapezoidal index preforms can be fabricated using any of the well known processes such as Modified Chemical Vapor Deposition (MCVD), Vapor-phase Axial Depostion (VAD); Vapor-phase Radial Deposition (VRD), Plasma Modified Chemical Vapor Deposition (PMCVD), etc. During preform fabrication the amount of dopant (e.g., Germanium) in the silica being deposited is varied and distributed radially in such a manner that a trapezoidal index profile with the desired aspect ratio, (S) can be obtained in the consolidated preform.

Figure 3:
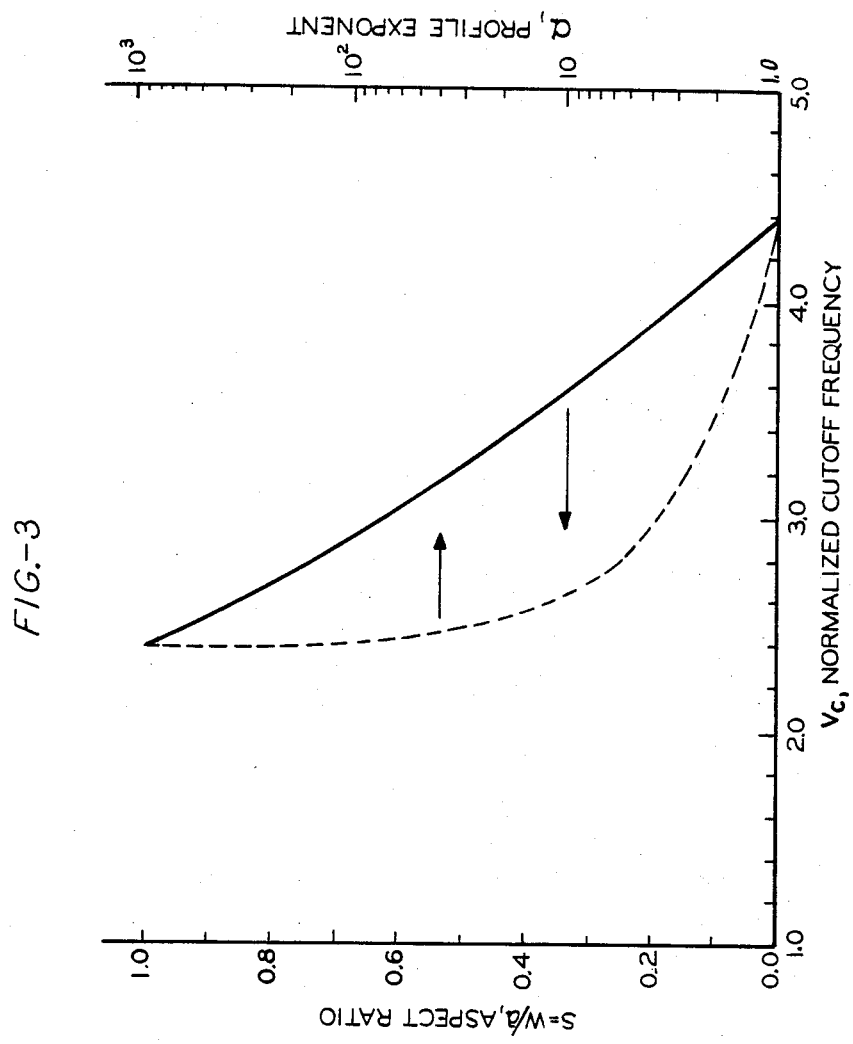
FIG. 3 shows curves of aspect ratios and profile exponents versus normalized cutoff frequency.

A further advantage associated with the instant single mode trapezoidal index is depicted in FIG. 3. $V_c$, the normalized cutoff frequency (i.e., that frequency above which the fiber will no longer support a single mode), is plotted against the aspect ratio (S) and the $\alpha$ (profile exponent) of the fiber. It can be seen that the solid line for $V_c(S)$ represents the relation between the cutoff frequency and the aspect ratio which varies almost linearly with S, while the broken line for $V_c(\alpha)$ changes exponentially with $\alpha$. Accordingly, due to the linear relationship a change in S results in a substantially equal linear change in $V_c$ while a small change in $\alpha$ can result in a very large change in $V_c$. Therefore, a predetermined value of $V_c$ is more readily obtained by adjusting S during the preform fabrication than by adjusting $\alpha$ as has been done heretofore.

It is to be understood that the embodiments described herein are merely illustrative of the principles of the invention. Various modifications may be made thereto by persons skilled in the art which will embody the principles of the invention and fall within the spirit and scope thereof.

What is claimed is:

1. A graded refractive index single mode lightguide fiber, wherein:

the fiber has a refractive index profile with the shape of a trapezoid.

2. The single mode lightguide fiber as set forth in claim 1, wherein:

the trapezoid shape has an upper base to lower base ratio between 0 and 0.3.

3. A graded refractive index single mode lightguide fiber, wherein:

the gradation of the refractive index, which is a function of the radial position transverse to the central longitudinal axis of the fiber, has a trapezoid shape with an upper base to lower base ratio between 0 and 0.3.

* * * * *